United States Patent [19]

Bashleben et al.

[11] Patent Number: 4,529,767
[45] Date of Patent: Jul. 16, 1985

[54] VINYL ACETATE EMULSION COPOLYMERS OF IMPROVED GLOSS

[75] Inventors: Christine P. Bashleben, Wheeling; Gregory D. Shay, Oak Forest; Alfred E. Smith, Mount Prospect, all of Ill.

[73] Assignee: DeSoto, Inc., Des Plaines, Ill.

[21] Appl. No.: 596,057

[22] Filed: Apr. 2, 1984

[51] Int. Cl.³ .............................................. B32B 27/08
[52] U.S. Cl. .................................... 524/323; 524/339; 524/340; 524/762; 524/510; 524/512; 524/507; 525/162
[58] Field of Search ............... 524/323, 339, 340, 762, 524/510, 512, 507; 525/162

[56] References Cited

U.S. PATENT DOCUMENTS

| | | | |
|---|---|---|---|
| 3,080,333 | 3/1963 | Kray et al. | 524/762 |
| 3,423,352 | 1/1969 | Levine et al. | 524/762 |
| 3,594,337 | 7/1971 | Shea | 524/339 |
| 4,338,379 | 7/1982 | Strolle et al. | 524/512 |

*Primary Examiner*—John Kight
*Assistant Examiner*—Marvin L. Moore
*Attorney, Agent, or Firm*—Dressler, Goldsmith, Shore, Sutker & Milnamow, Ltd.

[57] ABSTRACT

A thermosetting latex paint is disclosed which cures to provide better gloss and gloss retention of ultraviolet exposure. This latex paint comprises water having suspended therein copolymer particles of aqueous emulsion copolymerized monomers consisting essentially of monoethylenically unsaturated monomers including at least about 30% up to about 80% of vinyl acetate, the balance of the monomers in the copolymer including from 2% up to about 15% of monomers providing reactive hydrogen atoms, like hydroxyethyl methacrylate, to enable the copolymer to thermoset in the presence of a curing agent which reacts with the reactive hydrogen atoms of the copolymer, like hexamethoxymethyl melamine. The copolymer particles are suspended in the water by surfactant comprising at least 2% up to about 8%, based on total monomers, of an ethylene oxide adduct of an alkyl-substituted phenol having from 10-18 carbon atoms in the alkyl group with 5-14 moles of adducted ethylene oxide per mole of said substituted phenol. This surfactant is preferably incorporated by being present during the aqueous emulsion copolymerization which formed the latex.

17 Claims, No Drawings

VINYL ACETATE EMULSION COPOLYMERS OF IMPROVED GLOSS

DESCRIPTION

1. Technical Field

This invention relates to vinyl acetate-containing emulsion copolymers which deposit films having improved gloss and better gloss retention on ultraviolet exposure so as to be better adapted for use in coil coating.

2. Background Art

Vinyl acetate is an available and inexpensive monomer, and it has long been desired to use this monomer in large proportion in emulsion copolymers, but the properties conferred upon the copolymers by the vinyl acetate component have considerably limited the usefulness of these products. Since the vinyl acetate-containing emulsion copolymers form economical and practical aqueous coatings which do not require volatile organic solvents, it has been particularly desired to employ these aqueous emulsions in coil coating, but the initial gloss and the gloss retention on exposure to ultraviolet light have been inadequate.

It must be understood that the prior vinyl acetate-containing emulsion copolymers were produced in the same way that prior satisfactory high gloss copolymers had been produced in the absence of any large proportion of vinyl acetate monomer. It was thought that since the vinyl acetate component is easily and completely incorporated into the copolymer using conventional aqueous emulsion copolymerization procedures, the same good properties provided in the copolymer by acrylic ester monomers should be provided by the vinyl acetate monomer unless there were some inadequacy inherent in the vinyl acetate as a component of the copolymer. It is now found that this is not the case because the conventionally produced vinyl acetate-containing emulsion copolymers exhibit poor initial gloss and poor gloss retention on ultraviolet exposure, while both of these characteristics are significantly improved when the copolymerization is carried out with selected surfactant systems in accordance with this invention.

DISCLOSURE OF INVENTION

In accordance with this invention, a thermosetting latex paint comprises water having suspended therein copolymer particles of an aqueous emulsion copolymer of copolymerized monomers consisting essentially of monoethylenically unsaturated monomers including at least about 30% up to about 80% of vinyl acetate, the balance of the monomers in the copolymer including from 2% up to about 15% of monomers providing reactive hydrogen atoms to enable the copolymer to thermoset in the presence of a curing agent which reacts with the reactive hydrogen atoms of the copolymer. The copolymer particles of this invention are suspended in the water by surfactant comprising at least 2% up to about 8%, based on total monomers, of an ethylene oxide adduct of an alkyl-substituted phenol having from 10-18 carbon atoms in the alkyl group with 5-14 moles, preferably 6-12 moles, of adducted ethylene oxide per mole of alkyl-substituted phenol.

The latex described above is preferably produced by an aqueous emulsion copolymerization carried out in normal fashion, preferably at elevated temperature using redox catalysis, the copolymerization being carried out in the presence of the previously described surfactant which preferably comprises at least 3%, based on total monomers, of an ethylene oxide adduct of an alkyl-substituted phenol having from 11-14 carbon atoms in the alkyl group, with from 6-12 moles of adducted ethylene oxide per mole of alkyl-substituted phenol. Ethylene oxide adducts of dodecyl-substituted phenol containing 8 and 10 moles of adducted ethylene oxide per mole of the substituted phenol are particular contemplated. The corresponding decyl-substituted product is also fully useful. With an alkyl of 16 carbon atoms, it is preferred to use 10 and 12 moles of adducted ethylene oxide per mol of alkyl-substituted phenol. These surfactants are preferably used in an amount of from 3% to 6% of total monomers.

All proportions herein, including the examples and the accompanying claims, are by weight, unless otherwise stated.

The copolymers which are formed herein preferably contain at least about 50% of vinyl acetate, more preferably at least about 65% of vinyl acetate, and the balance of the copolymer should consist essentially of copolymerizable monoethylenically unsaturated monomers. Since the vinyl acetate content is maximized for economy, the balance of the monomers need not be very large, and is usually from about 25% to about 50%. This balance of monomers includes from 2% up to about 15%, preferably from 3% to 8%, of monomers providing reactive hydrogen atoms to enable the copolymer to thermoset in the presence of a curing agent which reacts with the reactive hydrogen atoms when the applied coating is baked. It is also desirable to have at least 10% of the copolymer, preferably at least 15%, constituted by an alkyl ester of a monoethylenic carboxylic acid, like acrylic or methacrylic acid. This provides an alkyl acrylate or methacrylate in which the alkyl group contains from 1 to 10 carbon atoms, preferably from 2 to 8 carbon atoms. Ethyl acrylate, butyl acrylate, butyl methacrylate and 2-ethyl hexyl acrylate or methacrylate, are all useful herein, n-butyl acrylate being preferred. It is desirable to have the selected ester, e.g., the alkyl acrylate or methacrylate, possess a glass transition temperature lower than that of vinyl acetate in order to somewhat soften the copolymer, and thereby increase its flexibility and impact resistance, as is itself well known. However, relatively little of such monomer need be used because a relatively hard film (a pencil hardness of H is typical) is desired to maximize abrasion resistance, especially resistance to metal marking.

Thermosetting copolymers are needed since the chain extension and cross-linking caused by a small proportion of curing agent in combination with the high molecular weight produced by the emulsion copolymerization provides the physical toughness which is needed for coil coat application. Solution copolymers could be cured to the same hardness, but these would lack the physical toughness desired herein because larger proportions of curing agent would be needed, and the organic solvents would be detrimental to the coil coating operation.

The preferred monomers providing reactive hydrogen atoms are hydroxy-functional monomers, such as 2-hydroxyethyl acrylate or methacrylate. The corresponding hydroxypropyl and hydroxybutyl acrylates and methacrylates are also useful. 2-hydroxyethyl methacrylate is particularly preferred. Other reactive monomers are illustrated by carboxy-functional monomers, like acrylic or methacrylic acids, or amine functional monomers, like allyl amine. The purpose of these reactive monomers is to provide a small number of active hydrogen atoms which can be reacted after application during a baking operation with a curing agent, these curing agents being themselves well known and in common use.

It is also desirable to include a small proportion of a carboxy-functional monomer, like acrylic or methacrylic acid, for this tends to assist the copolymerization and it generally enhances copolymer adhesion. It also is reactive, though the preferred reactive functional group is hydroxy, as previously noted.

In balancing the monomer content of the copolymer, it is preferred that the copolymer $T_g$ (glass transition temperature) be from $-10°$ C. to $+25°$ C., more preferably from $-5°$ C. to $+15°$ C.

The preferred curing agent is an aminoplast resin, illustrated by hexamethoxymethyl melamine, but other aminoplast resins which can be dispersed in water and used herein are known in the art. Similarly, one may use a phenoplast resin, like an A-stage resol of phenol and formaldehyde. However, various water soluble and dispersible phenoplast resins are well known and useful herein, including o-cresol-formaldehyde resins. One may also use organic polyisocyanates which have been blocked to avoid prereaction prior to baking, such as toluene diisocyanate blocked with octyl alcohol. The choice of curing agent is subject to wide variation and its proportion is governed by the proportion of reactive monomer in the copolymer. As will be evident, one would not wish to use more curing agent than is required to consume the reactive groups in the copolymer, and this generally suggests using from 2% to 20% of the weight of the copolymer, preferably from 5% to 15%.

The aqueous emulsion copolymerization in this invention is quite conventional with the single exception of the surfactant selection. Thus, reductants, such as sodium formaldehyde sulfoxylate, are typically used in combination with ferrous sulfate to provide a trace of ferrous ion to help initiate the formation of free radicals. A free-radical generating catalyst, such as benzoyl peroxide, t-butyl hydroperoxide or sodium or potassium persulfate, can be used as the oxidant, the hydroperoxide being preferred. A small amount of a chain terminator, such as 0.1% to 5.0%, of dodecyl mercaptan, may also be present to moderate the high molecular weight which results from the emulsion polymerization.

The copolymerization is typically carried out at a temperature in the range of 40° C. to 90° C., preferably from 55° C. to 70° C. It is preferred to operate at high solids content to form emulsions containing from 40% to 70% solids, more preferably from 45% to 60% solids. A preferred copolymerization in aqueous emulsion will be presented hereinafter.

The normal surfactants frequently include nonionic surfactants, either alone or in combination with anionic surfactants. The nonionic surfactants which are usually employed are those capable of maintaining the monomers and the resulting polymer in stable emulsion as the copolymerization moves forward to completion. While all sorts of surfactants have been used, in practice the nonionic surfactants normally used are ethylene oxide adducts of alkyl or alkylaryl hydrophobes, these containing at least about 20 moles of adducted ethylene oxide per mole of the hydrophobe in order that a minimal proportion of surfactant, generally less than 2% of the weight of the monomers being copolymerized, will be effective to stably suspend the monomer and polymer particles.

The surfactants required herein are relatively poor suspending agents because the alkyl chain length is long and because the proportion of ethylene oxide adducted with this long chain alkyl is small. This is why such a large proportion of the essential surfactant is needed in this invention. Indeed, and in the preferred practice of this invention, a more conventional surfactant is used in minor proportion, based on total nonionic surfactant, in order to improve the stability of the emulsions.

In any event, the long chain alkyl-substituted phenol ethoxylates used herein in fairly large amount, as previously detailed, apparently function as a reactive plasticizer, the long chain alkyl and its high proportion in the ethylene oxide adduct and in the copolymer providing a plasticizer function leading to high gloss in the baked film. Also important is the fact that the invention uses reactive copolymers in combination with a curing agent which reacts with active hydrogen atoms providing a capacity to tie up the large amount of hydroxy-functional nonionic surfactant. This prevents it from concentrating in the film which is formed which could defeat the exterior exposure capacity which is so important to this invention.

It is stressed that the large amount of surfactant used herein would normally suggest a lack of capacity to withstand exterior exposure, and the opposite result (better gloss retention on ultraviolet exposure) is achieved herein.

A minor proportion (from 5% to 45%) of total nonionic surfactant is preferably constituted by an octyl or nonylphenol ethoxylate containing from 20 to 80 moles of ethylene oxide per mol of the phenol. A nonyl phenol containing about 40 moles of adducted ethylene oxide is preferred. This conventional surfactant, when used alone, does not help the gloss. However, in combination with the essential surfactant described hereinbefore, it serves to further enhance the initial gloss, as well as to improve the ease of dispersing pigments in the emulsion, these normally being pigmented for use in coil coating.

Anionic surfactants, like sodium lauryl sulfate, may be included in the same say that anionic surfactants are frequently used in combination with nonionic surfactants.

The gloss achieved in this invention is conveniently measured by determining what proportion of an incident beam of light bounces off the cured surface. This is measured herein with a conventional glossmeter which employs an angle of 60° between the incident and the reflected beams. Typical gloss readings in the absence of the surfactant selection taught herein is up to about 40%. In contrast, using 4% of the preferred surfactant herein, gloss readings of about 65% are obtained, and using a preferred combination of surfactants, gloss readings of about 70% and higher are obtained.

As a matter of interest, coil coating involves the coating of a continuous length of flat metal sheet. This sheet, which is usually thin gauge steel or aluminum, is coiled around a spool which is continuously unwound to provide a strip of metal which is passed to a coating station where the strip is progressively coated, usually by direct or reverse roll coating, as it passes through the coating station. After the coating is applied, the wet-coated strip is passed through a baking station where its temperature is raised to cause the curing agent ot react with the active hydrogen atoms present in the copolymer and in the surfactant.

The invention is illustrated in the examples which follows.

EXAMPLE 1

A monomer pre-emulsion of the following materials is prepared:

| Component | Parts (by weight) |
|---|---|
| Deionized Water, $N_2$ sparged | 422.0 |
| Igepal RC-620 (see note 1) | 40.0 |
| Igepal CA-897 (70% dry solids) [see note 2] | 28.6 |
| Vinyl Acetate | 760.0 |
| n-Butyl Acrylate | 186.0 |
| Methacrylic Acid | 8.0 |
| 2-Hydroxyethyl Methacrylate (94% active) | 42.6 |
| t-Dodecyl Mercaptan | 5.0 |

Note 1: Dodecylphenoxy poly(ethyleneoxy)$_{10}$ ethanol
Note 2: Octylphenoxy poly(ethyleneoxy)$_{40}$ ethanol An initiator solution of the following composition is prepared:

| Component | Parts (by weight) |
|---|---|
| Deionized Water | 95.7 |
| t-Butyl Hydroperoxide (70% dry solids) | 4.3 |

A reductant solution of the following composition is prepared:

| Component | Parts (by weight) |
|---|---|
| Deionized Water | 95.7 |
| Sodium Formaldehyde Sulfoxylate | 3.0 |

A precharge of the following composition is prepared:

| Component | Parts (by weight) |
|---|---|
| Deionized Water, $N_2$ sparged | 342.0 |
| $FeSO_4.7H_2O$ in deionized Water (15% dry solids) | 3.0 cc |

A five liter four necked reaction flask is suspended in a water bath capable of sustaining a 65° C. temperature. The flask is equipped with a paddle stirrer, a water cooled condenser, a nitrogen inlet, and three inlets for monomer and initiator additions. A recording device is used to monitor the temperature in the flask and the water bath.

The precharge is added to the flask, and the water bath is heated to 65° C. Once the precharge temperature has stabilized (as shown by the recorder), 2.5% (34.0 parts) of the pre-emulsion is added to the flask, and the initiator and reductant additions are begun at such rates as to require four hours for the additions to be complete. The temperature in the flask increases to a peak in five to ten minutes, and then decreases. Once the temperature has peaked, the pre-emulsion addition is begun at such a rate as to require three and one-half hours for the addition to be complete. The reaction temperature increases over the next forty-five minutes, peaks, and then stabilizes at 67°-69° C. The initiator and reductant additions are continued until the reaction temperature has decreased to the water bath temperature, which takes approximately twenty minutes. The latex product is then cooled to 30° C., and filtered through a 500 mesh screen. The polymer physical properties are listed below.

| Non-Volatile Content, % | 51.5 |
|---|---|
| Particle size, microns* | 0.33 |
| Viscosity, cps** | 60 |
| Weight (lbs/gal) | 9.04 |
| Calculated $T_g$, °C. | +10.2 |

*The particle size was determined using a Coulter N-4 sub-micron particle analyzer.
**The viscosity was measured at 20 rpm with a number 2 spindle on a Brookfield viscometer.

The polymer is formulated into an aqueous coil coating as described below.

EXAMPLE 2

A pigmented coating composition is made in the following manner.

| Component | Parts |
|---|---|
| 1 Vinyl acrylic of Example 1 | 33.13 |
| 2 Coalescing aid (see note 1) | 2.12 |
| 3 Deionized water | 1.70 |
| 4 Wetting agent (see note 2) | 0.85 |

To a mixture of components 1-4, there is added a premix of 0.51 parts of a defoaming agent (see note 3) and 0.25 parts of a surfactant (see note 4). Then, there is added 26.76 parts of titanium dioxide, rutile, and the mixture is dispersed in a Cowles mixture to a North Standard rating of 7.5. This forms a pigment paste which is reduced by mixing in the following:

| Component | Parts |
|---|---|
| A Vinyl acrylic of Example 1 | 27.61 |
| B Hexamethoxymethyl melamine | 2.12 |
| C Slip agent (see note 5) | 0.17 |
| D Deionized water | 2.72 |

An additional 2.04 parts of water are held back and added to adjust viscosity, as needed.

The above pigmented coating composition is then applied to an aluminum substrate and cured by baking in a 500° F. oven until a piak metal temperature of 224° C. is reached which occurs in just under 45 seconds. The product was a cured film having a thickness in the range of 0.75 to 0.85 mils.

Final coating properties are as follows:

| Gloss, 60° meter | 75.9 |
|---|---|
| Pencil Hardness | H |
| 2T Bend Flexibility | no cracking, no pick-off |
| Reverse Impact (1½ × gauge) | no cracking, no pick-off |
| QUV Gloss Retention | 750 hours, 66% |

| Metal Mark Resistance | good |
|---|---|

Note 1: A copolymer of 65% ethyl acrylate, 26% methyl methacrylate and 9% acrylic acid in 30% solution in an equiweight mixture of ethylene glycol, propylene glycol and 2-ethoxyethanol acetate, the copolymer having a weight average molecular weight of 15,000. The commercial product, Texigel 23-555 of the Scott-Bader Co. may be used.
Note 2: The commercial wetting agent "Colloid 111M" of the Colloids Company is used to help wet the pigment which is ground in.
Note 3: A commercial defoaming agent "Bubble Breaker 33056-A" of the Balab Chemical Co. is used to minimize foaming as the pigment is dispersed.
Note 4: A mixture of 2,4,7,9-tetramethyl-5-decyne-4,7-diol and ethylene glycol having a specific gravity of .95. The commercial product "Surfynol 104H" of Air Products and Chemicals, Inc. may be used.
Note 5: Polymethyl polysiloxane in 50% solution in butylene glycol having a flash point of 65° C. The commercial product "Perenol S-5" of Henkel Inc. may be used. This silicone additive provides slip and mar resistance characteristics.

What is claimed is:

1. A thermosetting latex paint comprising water having suspended therein copolymer particles of aqueous emulsion copolymerized monomers consisting essentially of monoethylenically unsaturated monomers including at least about 30% up to about 80% of vinyl acetate, the balance of the monomers in said copolymer including from 2% up to about 15% of monomers providing reactive hydrogen atoms to enable the copolymer to thermoset in the presence of a curing agent which reacts with the reactive hydrogen atoms of the copolymer, said copolymer particles being suspended in said water by surfactant comprising at least 2% up to about 8%, based on total monomers, of an ethylene oxide adduct of an alkyl-substituted phenol having from 10-18 carbon atoms in the alkyl group with 5-14 moles of adducted ethylene oxide per mole of said substituted phenol.

2. A latex paint as recited in claim 1 in which said surfactant comprises from 3% to 6%, based on total monomers, of an ethylene oxide adduct of an alkyl-substituted phenol having from 11-14 carbon atoms in the alkyl group, with from 6-12 moles of adducted ethylene oxide per mole of alkyl-substituted phenol.

3. A latex paint as recited in claim 1 in which said copolymer contains at least about 50% of vinyl acetate, and said monomers providing reactive hydrogen atoms are hydroxy-functional.

4. A latex paint as recited in claim 3 in which said balance of the copolymer is from about 25% to about 50% of the copolymer and includes from 3% to 8%, of hydroxy ethyl acrylate or methacrylate.

5. A latex paint as recited in claim 4 in which said copolymer contains at least about 65% of vinyl acetate.

6. A latex paint as recited in claim 5 in which at least 10% of the copolymer is constituted by an alkyl ester of a monoethylenic carboxylic acid.

7. A latex paint as recited in claim 5 in which at least 15% of the copolymer is constituted by an alkyl ester of acrylic or methacrylic acid in which the alkyl group contains from 2 to 8 carbon atoms.

8. A latex paint as recited in claim 6 in which said alkyl ester possesses a glass transition temperature lower than that of vinyl acetate.

9. A latex paint as recited in claim 1 in which said surfactant includes from 5% to 45% of total nonionic surfactant of an octyl or nonyl phenol ethoxylate containing from 20 to 80 moles of ethylene oxide per mol of the phenol.

10. A latex paint as recited in claim 1 in which said paint further includes a curing agent reactive with the active hydrogen atoms in said copolymer.

11. A latex paint as recited in claim 10 in which said curing agent is present in an amount from 2% to 20% of the weight of the copolymer, and is selected from aminoplast resins, phenoplast resins, and organic polyisocyanates which have been blocked to avoid prereaction prior to baking.

12. A latex paint as recited in claim 11 in which said curing agent is hexamethoxymethyl melamine present in an amount of from 5% to 15% of the weight of the copolymer.

13. A method of producing a latex paint containing suspended copolymer particles containing a large proportion of vinyl acetate and which exhibits improved gloss and gloss retention on ultraviolet exposure, comprising copolymerizing in an aqueous emulsion, monomers consisting essentially of monoethylenically unsaturated monomers including at least about 30% to about 80% of vinyl acetate, the balance of the monomers including from 2% up to about 15% of monomers providing reactive hydrogen atoms to enable the copolymer to thermoset in the presence of a curing agent which reacts with the reactive hydrogen atoms of the copolymer, said copolymerization being carried out in the presence of surfactant comprising at least 2% up to about 8%, based on total monomers, of an ethylene oxide adduct of an alkyl-substituted phenol having from 10-18 carbon atoms in the alkyl group with 5-14 moles of adducted ethylene oxide per mole of said substituted phenol.

14. A method as recited in claim 13 in which said copolymerization is carried out in the presence of from 3% to 6%, based on total monomers, of an ethylene oxide adduct of an alkyl-substituted phenol having from 11-14 carbon atoms in the alkyl group, with from 9-11 moles of adducted ethylene oxide per mole of alkyl-substituted phenol, said monomers containing at least about 50% of vinyl acetate, and said monomers providing reactive hydrogen atoms are hydroxy-functional.

15. A method as recited in claim 13 in which said copolymerization is carried out in the presence of 0.1% to 5.0% of a chain terminator.

16. A method as recited in clam 13 in which said copolymerization is carried out at a temperature in the range of 40° C. to 90° C., at a solids content of from 40% to 70% solids.

17. A method as recited in claim 13 in which said surfactant includes from 5% to 45% of total nonionic surfactant of an octyl or nonylphenol ethoxylate containing from 20 to 80 moles of ethylene oxide per mol of the phenol.

* * * * *